United States Patent Office 2,906,700
Patented Sept. 29, 1959

2,906,700

ALLOYS OF PLATINUM AND GERMANIUM AS CATALYSTS FOR THE REFORMING OF N-PARAFFIN HYDROCARBONS

Harrison M. Stine, Cleveland, Harold Arthur Strecker, Bedford, and Robert B. Faris, Jr., Solon, Ohio, assignors to The Standard Oil Company, Cleveland, Ohio, a corporation of Ohio No Drawing. Application December 31, 1957
Serial No. 706,254

9 Claims. (Cl. 208—138)

This invention relates to a process of making a catalyst comprising a solid solution of platinum and germanium on a support, to the catalyst itself, and to a process of reforming petroleum hydrocarbons with the catalyst.

There has been a continuing need in the petroleum industry to upgrade the quality or octane number of liquid hydrocarbon fuels such as gasoline. Numerous reforming or conversion processes have been developed whereby the molecular structures of petroleum hydrocarbons boiling in the gasoline range are altered to provide a product having a higher octane number. Such reforming processes have been particularly effective in the conversion of heavy naphthas, characterized herein as those hydrocarbons having from 8 to 12 carbon atoms per molecule, or a stock 80% of which boils within the range of about 225 to 450° F. Several well-known catalysts for this purpose comprise platinum or molybdenum. The conversion of light petroleum naphthas, stocks the hydrocarbons of which have primarily from 5 to 7 carbon atoms per molecule, or a stock 80% of which boils between 50 and 225° F., has not seen as much development. While the catalyst of this invention may be used in the treatment of heavy naphtha, it is especially adapted for upgrading the quality of the light naphtha fraction.

When naphtha is subject to a reforming process, the products, under ambient conditions of temperature and pressure, will consist of gas, coke, and converted and unconverted liquid hydrocarbons.

The fraction of the feed which is chemically altered is a measure of catalyst activity; the fraction which is converted to wanted or useful products is a measure of catalyst selectivity. Ideally a catalyst should have high activity and high selectivity. In actual practice, however, these two properties generally vary inversely and it is often necessary to effect a compromise. For example, it may be more economic to sacrifice activity for selectivity in order to minimize the loss which results from conversion to coke and gas. If high conversions are more important than the gas and coke losses associated with such yields, then a catalyst having high activity and low selectivity may be preferred.

The catalyst of this invention, therefore, is a reforming catalyst comprising 0.1 to 10% by weight of a solid solution of platinum and germanium on a support, the proportion of platinum in the solid solution may be in the range of from 5 to 95% by weight. Palladium may be substituted for all or a part of the platinum in this catalyst and is the equivalent of platinum.

The present invention also includes a method of reforming petroleum naphtha (light and/or heavy as defined heretofore) which comprises contacting naphtha with the above catalyst at temperatures ranging from 700 to 1050° F. Various reactions occur when the hydrocarbons are contacted with said catalyst, for example; dehydrogenation, isomerization, coking, cracking, etc., the effect obtained depending on the temperature of the reaction and other conditions. Dehydrogenation is obtained as the primary reaction with temperatures from about 875 to 975° F. at approximately atmospheric pressure in the absence of added hydrogen, especially when light naphtha is so treated.

Light naphtha contains normal paraffins, cycloparaffins, isoparaffins, and aromatics. The normal paraffins have particularly low octane numbers. The more desirable types of hydrocarbons are olefins, cycloparaffins, aromatics, and isoparaffins. There is little advantage in converting aromatics to cycloparaffins or vice versa, as these two types of compounds generally have blending octane values which are approximately equal. The conversion of normal paraffins to isoparaffins and/or to straight chain olefins, and the conversion of isoparaffins to iso-olefins are most desirable.

The most elementary form of dehydrogenation is the removal of hydrogen from the hydrocarbon molecule resulting in an unsaturated hydrocarbon and free hydrogen, as typified by conversion of a straight chain paraffin to a straight chain olefin. Due to the reactive nature of unsaturated hydrocarbons, under the reaction conditions, subsidiary or secondary reactions may be inherent in a dehydrogenating process. On this basis, isomerization cyclization or aromatization reactions may also be inherent in dehydrogenation reactions.

Finally, the invention relates to a process for producing the catalyst which comprises impregnating a support with a platinum compound and a germanium compound, both compounds in an amount sufficient to yield a catalyst of the desired composition, and co-reducing the compounds to form the metal and heating the supported metals at 800 to 1800° F.

The catalyst of this invention may be prepared using any acceptable support. The supports composited with the platinum solid solutions may be natural or synthetic in nature. These supports may be chemically inert, or they may possess catalytic activity. Natural supports, for example, comprise bentonite, bauxite, clays, kieselguhr, zeolites, etc.; and synthetic supports comprise activated alumina, silica-alumina, silica, charcoal, magnesia, zirconia, thoria, etc. These supports may be used singularly or in combination. The preferred supports for this invention comprise alumina, silica-alumina, and silica.

Catalyst preparation processes are widely varied and, for example, would include separate or co-precipitation, impregnation, etc. The catalyst is preferably manufactured by impregnating the support with compounds of the metals to be employed. The impregnated support is treated to co-reduce the compounds and heat treated to form the solid solution which is characteristic of the catalyst of the invention. Co-reduction and heat treating may be conducted simultaneously or in separate steps.

The support, in either pulverulent or pellet form, especially when the catalyst is to be used for dehydrogenation of light naphtha in the absence of added hydrogen, is preferably heated prior to impregnation at an elevated temperature for a period of time to drive off moisture. This pretreatment or activation assures more uniform adsorption of impregnating solutions by the support.

The impregnating solution consists of a volatile liquid solvent, such as water, having dissolved therein soluble compounds of platinum, such as chloroplatinic acid, and of germanium, such as germanium tetrachloride. These soluble compounds will, upon decomposition or chemical reduction, preferably form no other solid except that of the metal itself. Non-metallic decomposition products will be volatilized and removed by the subsequent heat treatment of the impregnated support. The amount of solid solution on the support may vary between wide limits. A range of 0.1 to 10%, based on the weight of support, has been found operable, although for economic reasons a range of 0.1 to 2.0% is preferred. The relative amount of germanium may range from 5 to 95%, based on the weight of the solid solution. The preferred ranges vary with the temperature at which the solid solution is formed on the support. The preferred ranges are 10 to 75% when formed at 1000° F. and 25 to 80% when formed at 1500° F.

Following impregnation, the catalyst is dried by heating. Thereafter, the metal compounds are reduced by further heating in a reducing atmosphere, for example, in an atmosphere of hydrogen. Finally, the catalysts are heated to a temperature in excess of 800° F., preferably over 1000° F. and not over that temperature at which an appreciable amount of the metal vaporizes from the support. This upper temperature will seldom exceed 2100° F.

The dried catalyst may be co-reduced and heat treated in separate steps by first reducing the catalyst in an atmosphere of hydrogen followed by heat treating the catalyst in an inert atmosphere, such as an atmosphere of nitrogen. However, co-reduction and the final heat treatment are preferably conducted simultaneously by heating the catalyst in a hydrogen atmosphere.

The heat treatment imparts an unexpected improvement in catalytic activity. It is thought that the heat treatment achieves more intimate admixture of the metals and in some cases causes them to alloy or enter into a solid solution form more completely. The exact state of admixture is unknown, but for satisfactory catalytic activity, it is believed to be that state which results from the co-reduction and heating of a support impregnated with compounds of platinum and germanium.

Co-reduction of large or commercial quantities of the metal compounds may be incomplete, thereby leaving small concentrations of the initial ingredients on the support. Furthermore, when the catalysts are regenerated (removal by air oxidation of the coke deposited on the catalyst in a reforming reaction), some of the metals may be converted to their respective oxides. Reference to the metals herein relates to either metal in whatever form it may exist, and concentrations are expressed in terms of the pure metal.

Catalysts produced in the above-described manner are effective in promoting the conversion of petroleum naphthas. For best results, the reaction should be carried out within a temperature range of 700 to 1050° F. In a preferred embodiment, the stocks are those in which 80% boil between 50 and 225° F., otherwise known as light naphtha, and are treated at temperatures of 875 to 975° F., at space velocities of 0.1 to 10 v.v.h. (volume of liquid hydrocarbon feed per hour divided by the volume of the catalyst bed), and at essentially atmospheric pressure in the absence of added hydrogen.

The invention will be better understood from the following examples:

CATALYST PREPARATIONS A–E

Table I below summarizes the composition for five different catalysts, using alumina as a support, Catalyst A being produced by the method of the present invention except that only platinum is used as the catalyst metal, Catalyst B, C, and D, inclusive, being representative of the catalysts of the present invention, and Catalyst E being unimpregnated, heat-treated alumina. Since all catalysts were made in a similar manner, only the preparation of Catalyst B will be explained in detail, as it is representative of each preparation except where indicated.

*Support.*—The support consisted of 100 grams of pellets of alumina in the form of cylinders measuring about ⅛ inch in diameter and ⅛ inch in length. They were "activated" by heating to a temperature of about 1100° F. for six hours, after which their surface area ranged from about 150 to 200 m.$^2$/gm.

*Impregnating solution.*—The impregnating solution was prepared by mixing 0.732 gram of germanium tetrachloride, $GeCl_4$, containing 0.25 gram of germanium, with 19.95 grams of an aqueous solution containing 1.995 grams of chloroplatinic acid, $H_2PtCl_6 \cdot 6H_2O$ (containing 0.75 gram of platinum), and sufficient concentrated hydrochloric acid to solubilize the germanium salt and to bring the total volume up to about 40 ml.

*Impregnation.*—The 40 ml. of the impregnating solution was added to 100 grams of the "activated" alumina support. The mixing in these proportions gave a damp catalyst. It appeared that the catalyst was thoroughly saturated with the solution. None of the impregnating solution drained away from the damp catalyst.

*Heat treatment.*—The damp catalyst was first heated overnight in air at about 250° F. Then it was heated in an atmosphere of hydrogen at 1000° F. for 10 hours. The resulting catalyst had a solid solution concentration of 1%, based on the weight of the support, and a surface area of about 100 m.$^2$/gm. The solid solution itself consisted of 25% germanium and 75% platinum.

*Table I*

| Catalyst | Impregnating solution components, grams/100 gm. alumina support | | Alloy metal conc. in weight percent of support | |
|---|---|---|---|---|
| | $H_2PtCl_6 \cdot 6H_2O$ | $GeCl_4$ | Ge | Pt |
| A | 2.660 | | | 1.00 |
| B | 1.995 | 0.732 | 0.25 | 0.75 |
| C | 1.330 | 1.464 | 0.5 | 0.5 |
| D | 0.665 | 2.196 | 0.75 | 0.25 |
| E | 0.0 | 0.0 | 0.0 | 0.0 |

In order to show the effect of heat-treating temperature on catalyst activity, samples of both Catalyst A and C, which had been heat treated at 1000° F., were further subjected to a temperature of 1500° F. for 20 hours in an atmosphere of hydrogen. Their surface area, thereafter, averaged 80–85 m.$^2$/gm. Other samples were heat treated at 1800° F. in an atmosphere of hydrogen, after which they had average surface areas of about 25 m.$^2$/gm.

Each of the catalysts prepared above were used in fixed bed reforming operations employing as feed a liquid mixture consisting of 90 volume percent heptane and the balance toluene. The ratio of alkanes to aromatics in this mixture is comparable to that found in many light naphtha fractions. Reforming operations with alumina support (Catalyst E) not only provide a basis for comparing the effect of the platinum-germanium solid solution, but also for showing the effect of the germanium in the absence of platinum. Germanium alone has no appreciable catalytic activity under reforming operation conditions.

The reforming conditions common to each operation were as follows:

Feed rate, liquid volume per volume of catalyst per
   hour _____ 1
Reactor temperature, ° F _____ 950
Pressure, gauge _____ 0

Three types of products, measured at ambient temperature and pressures, were obtained from these reforming operations, namely, liquids, gases, and solids (coke). The weight of gas was calculated from its measured volume rate of flow and average density. The weight of coke deposited on the catalyst was determined by air oxidation of the coke followed by analysis of the combustion products in accordance with well-known procedures. The liquid product was weighed and then analyzed for its aromatic, olefinic, and isoparaffin content. The results of these operations are set forth in Table II. Useful product yields and total conversion are also shown in Table II. The product "Aromatics (net)" was determined by subtracting 10% from the total aromatic fraction in the liquid product in order to account for the aromatics (10% toluene) in the feed.

*Table II*

| (1) Exp. No. | (2) Catalyst | (3) Heat treat, °F. | Product yields in weight percent of feed | | | | Product yields (no loss basis), vol. percent of feed | | |
|---|---|---|---|---|---|---|---|---|---|
| | | | (4) Liquid | (5) Gas | (6) Coke | (7) Total | (8) Aromatics (net) | (9) Olefins | (10) Isoparaffin |
| 1 | A | 1,000 | 89.5 | 1.3 | 2.0 | 92.8 | -1.1 | 2.1 | 0.0 |
| 2 | B | 1,000 | 77.8 | 11.5 | 7.3 | 96.6 | 31.4 | 10.1 | 2.0 |
| 3 | C | 1,000 | 87.5 | 13.6 | 5.2 | 106.3 | 30.6 | 10.9 | 2.5 |
| 4 | D | 1,000 | 85.8 | 11.5 | 3.9 | 101.2 | 15.6 | 9.6 | 0.0 |
| 5 | E | 1,000 | 92.5 | 3.7 | 1.3 | 97.5 | -4.6 | 3.5 | 0.0 |
| 6 | A | 1,500 | 87.7 | 8.1 | 2.8 | 98.6 | 13.1 | 11.2 | 0.2 |
| 7 | B | 1,500 | 91.0 | 6.4 | 2.6 | 100.0 | 32.2 | 9.0 | 0.0 |
| 8 | C | 1,500 | 89.5 | 7.7 | 2.8 | 100.0 | 29.4 | 9.5 | 0.0 |
| 9 | D | 1,500 | 83.7 | 12.2 | 2.4 | 98.3 | 40.2 | 6.5 | 0.0 |
| 10 | E | 1,500 | 94.4 | 2.2 | 0.2 | 96.8 | -2.2 | 2.1 | 0.0 |
| 11 | A | 1,800 | 98.9 | 1.0 | 1.7 | 101.6 | -0.2 | 4.5 | 0.0 |
| 12 | C | 1,800 | 92.5 | 2.1 | 1.5 | 96.1 | 1.4 | 2.1 | 1.6 |

The values in columns 8, 9, and 10 of Table II show that Catalysts B, C, and D of the present invention when heat treated at both 1000 and 1500° F. are far more active than Catalyst A of the prior art in the reforming of light naphtha. Selectivity is the highest for aromatics, intermediate for olefins, and low for isoparaffins.

By graphing and interpolating the data from the table, it is seen that for the platinum-germanium catalyst heat treated at 1000° F., the maximum conversion occurs when the alloy contains about 35% germanium. It is also seen that conversions show a marked increase in the 5 to 95% germanium range.

When the catalyst is heated at 1500° F., maximum conversions occur at about 75% germanium, whereas they are appreciable throughout the range 10 to 85%. The shift in the maximum conversion point from 35 to 75% germanium when the temperature at which the catalysts are treated is raised from 1000 to 1500° F. shows the flexibility of this heat treatment step in the process of making the catalysts.

The effect of heat-treating temperature on Catalysts A and C are also indicated by graphical interpolations of data from the table. The activity of Catalyst C exceeds that of Catalyst A throughout the 1000 to 1800° F. range, although the activity of both falls rapidly above 1700° F.

CATALYST PREPARATION F-H

Table III summarizes the solid solution compositions for catalysts using granular activated silica as a support. Catalyst F being produced by the method of the present invention except that only platinum is used as the catalyst metal, Catalysts G and H being representative of the catalysts of the present inventions.

*Table III*

| Catalyst | Alloy metal conc. in weight percent of support | |
|---|---|---|
| | Ge | Pt |
| F | | 1.00 |
| G | 0.25 | 0.75 |
| H | 0.50 | 0.50 |

The catalysts were prepared similarly to the catalyst preparations A-E, the only difference being granular activated silica being used as the support rather than activated alumina. The granular activated silica was impregnated with a solution of the chloroplatinate of the solid solution constituent containing sufficient excess platinum chloride to provide the desired ratio of platinum to the other solid solution constituent. The metal content of the solution being calculated to give a concentration of 1% of solid solution in the finished catalyst. The catalysts were first heated overnight in air at about 250° F. They were then heated in an atmosphere of hydrogen at 1000° F. for 10 hours and then activity tested.

To show the effect of heat treatment, samples of Catalysts F, G, H were subjected to the higher temperature of 1500° F. in an atmospheric of hydrogen for about 20 hours.

The reforming conditions common to each operation were as follows:

Feed rate, liquid volume per volume of catalyst per hr. _____ 1
Reactor temperature, °F. _____ About 950
Pressure, gauge _____ 0

The products were collected and analyzed and described in the examples of Catalyst Preparations A-E. Table IV summarizes these results.

*Table IV*

| (1) Exp. No. | (2) Catalyst | (3) Heat treat, °F. | Product yields in weight percent of feed | | | | Product yields (no loss basis), vol. percent of feed | | |
|---|---|---|---|---|---|---|---|---|---|
| | | | (4) Liquid | (5) Gas | (6) Coke | (7) Total | (8) Aromatics (net) | (9) Olefins | (10) Isoparaffins |
| 13 | F | 1,000 | 70.2 | 27.4 | 3.2 | 100.8 | 29.0 | 9.5 | 1.6 |
| 14 | G | 1,000 | 79.5 | 16.5 | 3.4 | 99.4 | 15.6 | 13.5 | 0.6 |
| 15 | H | 1,000 | 87.5 | 10.5 | 2.8 | 100.8 | 18.0 | 14.4 | 1.2 |
| 16 | F | 1,500 | 80.0 | 10.4 | 2.9 | 93.3 | 17.5 | 19.2 | 2.7 |
| 17 | G | 1,500 | 89.4 | 8.5 | 1.3 | 99.2 | 5.2 | 16.6 | 5.7 |
| 18 | H | 1,500 | 89.0 | 9.1 | 1.5 | 99.6 | 6.6 | 20.6 | 5.4 |

The olefin yield values in column 9 of Table IV show that Catalysts G and H of the present invention heat treated at 1000° F. are more selective than Catalyst F of prior art. Catalysts G and H heat treated at 1000° F. and Catalyst H heat treated at 1500° F. produce a much greater quantity of olefins, while Catalysts G and H heat treated at 1500° F. are far more selective in the formation of isoparaffins. Maximum blending octane numbers obtainable with olefins are higher than for aromatics, and though isoparaffins have about the same maximum blending octane values as aromatics, they can be dehydrogenated to iso-olefins which have much higher blending numbers.

The gas and coke formation data in columns 5 and 6 of Table IV, show that the catalysts of the present invention produce less "losses" than the catalyst with platinum alone.

Catalysts of the present invention also have the added advantage of being less costly to prepare as compared to the catalysts using platinum only.

We claim:

1. The method of producing a reforming catalyst which comprises impregnating a support with platinum and germanium compounds, heating at a temperature 900 to 1800° F. in a reducing atmosphere to form a solid solution of said platinum and germanium, the proportions of said platinum and germanium compounds providing a weight ratio of platinum to germanium ranging from 5 to 95% in the finished catalyst.

2. The method of claim 1 in which the support is activated by heating at a temperature of about 1100° F. for six hours before the support is impregnated with the platinum and germanium solutions.

3. The method of claim 1 in which hydrogen comprises the reducing atmosphere.

4. The method of producing a reforming catalyst which comprises impregnating a support with platinum and germanium compounds, co-reducing said platinum and germanium compounds in a reducing atmosphere, heating at temperatures of 900 to 1800° F. in an inert atmosphere to form a solid solution of said platinum and germanium compounds providing a weight ratio of platinum to germanium ranging from 5 to 95% in the finished catalyst.

5. The method of claim 4 in which hydrogen comprises the reducing atmosphere.

6. The method of claim 4 in which nitrogen comprises the inert atmosphere.

7. A hydrocarbon conversion catalyst comprising a support and a solid solution comprising germanium and a metal selected from the group consisting of platinum and palladium, said solution being present in an amount within the range of 0.1 to 10% by weight of the support and containing at least 5% of each of the components of said solution.

8. The catalyst of claim 7 in which the support is selected from the group consisting of alumina, a mixture of alumina and silica, and silica.

9. A hydrocarbon conversion catalyst comprising alumina and a solid solution comprising germanium and platinum, said solution being present in an amount within the range of 0.1 to 2% by weight of alumina and containing at least 5% of each of the components of said solution.

No references cited.